United States Patent
Van Saane et al.

[15] 3,692,763
[45] Sept. 19, 1972

[54] HIGH PRESSURE POLYMERIZATION OF ETHYLENE AND APPARATUS THEREFORE

[72] Inventors: Pieter Van Saane, Beatrixlaan 21, Geleen; Robert J. M. Paumen, Rijksweg N. 296, Sittard, both of Netherlands

[22] Filed: Sept. 17, 1970

[21] Appl. No.: 73,170

[30] Foreign Application Priority Data

Sept. 19, 1969 Netherlands..............6914299

[52] U.S. Cl.............260/94.9 P, 23/289, 260/94.9 R
[51] Int. Cl............C08f 3/04, C08f 1/60, C08f 1/98
[58] Field of Search.........260/94.9 P, 94.9 R; 23/289

[56] References Cited

UNITED STATES PATENTS 2,763,699  9/1956  Van Dijk et al......260/94.9 M

FOREIGN PATENTS OR APPLICATIONS 471,590  9/1937  Great Britain........260/94.9 R
742,625  12/1955  Great Britain........260/94.9 R Primary Examiner—James A. Seidleck
Assistant Examiner—A. Holler
Attorney—Cushman, Darby & Cushman

[57] ABSTRACT

A process for the high pressure polymerization of ethylene in an autoclave reactor is disclosed, wherein the autoclave contents are maintained in a thoroughly mixed condition by converting the pressure energy of the ethylene feed into kinetic energy by throttling the flow of ethylene feed into the autoclave, to create a turbulent flow wherein the Reynolds number exceeds 2100, to produce macroscopic circulations in the autoclave. Such a process has numerous advantages, primarily in the reduction of the number of explosive decompositions of ethylene. Apparatus for conducting such a process are also disclosed, wherein such apparatus includes an autoclave having at least one ethylene feed inlet which imparts a rotary motion to the autoclave contents.

14 Claims, 2 Drawing Figures

HIGH PRESSURE POLYMERIZATION OF ETHYLENE AND APPARATUS THEREFORE

BACKGROUND OF THE INVENTION

In the continuous preparation of polyethylene by polymerizing ethylene under conditions of elevated pressure, e.g. 800 to 5000 atmospheres, and elevated temperatures, e.g. about 130° to 300 C, is normally conducted in a reactor in the presence of suitable free-radical initiators. In the high-pressure polymerization of ethylene, two types of reactors are conventionally used, the tubular reactor and the autoclave reactor. An autoclave reactor, in the sense of the present invention, is an internally cylindrical thick walled vessel which is closed at the top and has a discharge opening in the bottom.

In such autoclave reactors, the monomer, the polymerization initiator, and any other conventional additives, such as stabilizers, regulators, solvents, emulsifiers and the like, are fed, under pressure, to the reactor by means of feed pumps with the quantities (and ratios) of the various components automatically controlled. The monomers and other additives are fed in continuously through one or more feed inlets, generally located in the wall of the autoclave and the polymerization product obtained is continuously removed from the autoclave. The ethylene and the initiator may be fed to the reactor either together or separately.

The polymerization of ethylene is strongly exothermic and is therefore difficult to control. It is generally unfeasible to remove the heat of polymerization through the autoclave wall. A heat balance may be maintained by supplying cold ethylene, at a suitably low temperature, which becomes heated when introduced into the autoclave but only part of which reacts, so that excess exothermic heat is carried away together with the excess gas. Such a procedure generally limits the conversion per compression cycle (the present invention generally relates to ethylene gas, or gaseous ethylene, but it should be noted that in the present process, the ethylene is compressed considerably above its critical pressure of 50.9 atmospheres. This condition can also be achieved via a liquid initial condition). Therefore, the feed ethylene gas takes up and later gives off almost as much heat as is liberated in the polymerization reaction. The reactor contents heat the ethylene feed to a temperature at which the polymerization reaction can proceed. It will be appreciated that the reaction components must be thoroughly mixed, to insure that the liberated heat of polymerization will be immediately taken up through intimate contact with the ethylene feed. Mixing of the reaction components should be conducted continuously, as otherwise nonhomogeneous conditions in the autoclave contents may result in large irregularities in heat evolution. Thus, when the initiator concentration is locally too high, more heat will be evolved at such location than elsewhere in the reactor, with the result that the reaction may get out of control, leading to the decomposition of the ethylene and possible damage to the reactor. Similar effects may result from local overheating because the polymerization in over heated areas will proceed at an increased rate, which in turn generates more polymerization heat in the said areas, whereas in areas where the temperature is too low, the reaction may be extinguished. Note, for instance, the article "High Pressure Processes for Polymerizing Ethylene" by Lyle F. Albright, *Chemical Engineering*, Dec. 19, 1966 pages 112–120. The prior art has used autoclave reactors for the high pressure polymerization of ethylene, which reactors are provided with a mechanically driven stirring device. At the high pressures of 800 – 5000 atmospheres conventionally used, the autoclaves are constructed rather slenderly for reasons of strength. The length-diameter ratio (L/D) both measured internally, is a measure of the slenderness from a construction viewpoint. Difficulties arise in driving a stirring device in thick-wall, high-pressure equipment. To obviate the problems of sealing of a rotating shaft at the high pressures utilized, the art has fitted an electric driving motor in the same pressure housing as the autoclave. Such an approach, however, limits the dimensions and therefore the available power of the motor, and operation of such a stirred reactor has numerous drawbacks. The part of the stirrer located in the interior of the autoclave generally consists of a stirrer shaft provided with paddles and/or blades, and the shaft is generally supported on one or more bearings. To avoid contamination, such bearings should not be lubricated, but the presence of an unlubricated bearing may produce local temperature rises and is also a cause of reactor failure. Such unlubricatd bearings may easily heat up to a temperature of 100° or more above the polymerization reaction temperature and may, as an additional source of heat, frequently cause explosions. The use of a mechanical stirrer also frequently produces mechanical failures. Deposition of polymer upon the stirrer paddles and/or blades may cause dynamic unbalance of the stirrer shaft with resulting vibrations and additional load on the bearings. Explosive decomposition of the ethylene, may bend the stirrer shaft, which can result in damage to the autoclave walls, with costly and time-consuming repairs involved.

French Pat. No. 1,204,787 proposes to conduct polymerizations in a reactor without the use of a stirring device. The patent discloses, however, that the mixing is done outside of the reactor. The patent discloses the use of centrifugal pumps on the feed lines, which indicates that the reaction vessel pressures cannot be very high, and hence the polymerization is conducted under low pressure.

As far as is known, the art has not attempted to achieve effective mixing in high pressure ethylene polymerization by converting pressure energy of the feed ethylene into kinetic energy.

British Pat. specification No. 471,590 discloses, at page 5, lines 77 – 80, that, in the high pressure polymerization of ethylene, the gas should be kept in turbulent motion while at the reaction temperature. However, no information is given as to how such turbulent flow is obtained. Furthermore, British Pat. specification No. 742,625 suggests a high pressure jet injector as a possible means for effecting thorough mixing in an autoclave reactor for the high pressure polymerization of ethylene (note page 3, lines 17 – 26). No particulars about the jet injector are given, however, and the patent equates such injector with a mechanical stirrer.

SUMMARY OF THE INVENTION

The present invention relates to the continuous preparation of polymers of ethylene in an autoclave reactor. The mechanical energy necessary for mixing the reaction components in the autoclave is supplied by the ethylene fed into the autoclave, without using a mechanical stirrer in the autoclave. The ethylene fed to the autoclave is throttled to create a turbulent ethylene flow having a Reynolds number exceeding 2,100, with a direct impulse transfer from the fed ethylene to the autoclave contents to produce macroscopic circulations in the autoclave.

The polymerization process is conveniently conducted in an autoclave having ethylene-feed inlet means which impart a rotary motion to the autoclave contents

DETAILED DESCRIPTION OF THE INVENTION

Figure 1:
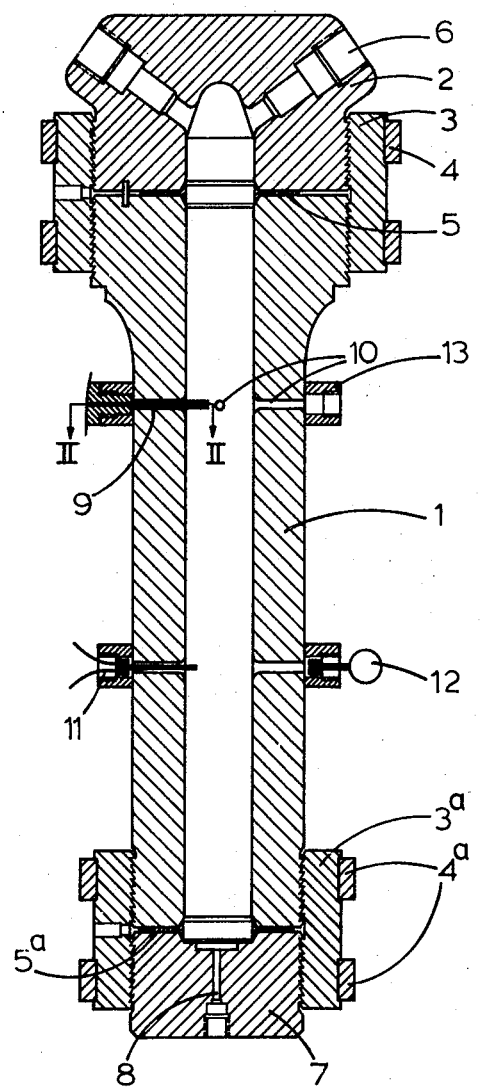

The process of the present invention, which eliminates the drawbacks discussed above as to the prior art process, supplies the mechanical energy necessary for the thorough mixing of the autoclave contents by the ethylene fed into the autoclave. Thus, the present process involves the high pressure polymerization of ethylene in an autoclave wherein a mechanical stirrer is not required in the autoclave and the kinetic energy necessary for the mixing of the reactor contents is obtained by throttling the ethylene flow at or near the point of entering the autoclave to directly transfer an impulse from the entering ethylene to the autoclave contents. Such throttling is provided by one or more constrictions placed in the ethylene fed line. Since the flow is throttled immediately prior to entering the reactor, it impinges, at a very high velocity, generally at at least 150 meters per second, with the reaction mass present in the interior of the autoclave, whereby such mass, together with the entering ethylene gas, is set, and kept, in rotary mixing motion by the impulse transfer. As used herein, throttling means causing the gas to flow through a constriction, such as a discharge nozzle, so that an isentropic energy conversion of pressure into velocity occurs. The velocity created in the discharge nozzle is utilized in the autoclave to effect turbulence with consequential microscopic mixing of the autoclave contents and macroscopic or mass circulations in the autoclave.

It is critical that the gaseous ethylene entering the reactor, be in a condition of turbulent flow, and also that such flow causes macroscopic or mass circulations in the autoclave. From known principles of fluid mechanics, turbulent flow will be created in a tube, such as the discharge nozzle, if the Reynolds number exceeds 2,100, and this criteria should be used in designing the constriction locations for use according to the invention.

At a high internal L/D ratio of the autoclave, it may be necessary to supply a number of discharge nozzles for supplying ethylene in order to create sufficient turbulence and circulation throughout the autoclave and avoid dead corners in the flow pattern. The determination of the number of discharge nozzles is well within the skill of the art and, in any event, can be readily determined by simple experimentation. Conveniently, all such discharge nozzles are similarly fit and carefully adjusted to be interchangeable, with the advantage of achieving accurate adjustment of the quantity of ethylene gas introduced into the reactor. The initiator and the ethylene are preferably mixed beforehand, such a procedure is a very effective means of preventing the formation of hot spots in the reactor. With such effective pre-mixing, the autoclave used may be smaller, without changing the throughput of the autoclave, or else the size of the autoclave may be maintained with a consequential increase in throughput thereof.

It is preferred that the reactor pressure be from 800 to 5,000 atmospheres, more preferably from about 1,000 to about 2,500 atmospheres. At the aforesaid pressures, the reaction temperature will generally be in the range of 130° to 300° C, preferably 170° to 270° C. The velocity with which the ethylene is fed to the reactor must be high enough for the required mixing figure, and is at least 150 meters per second. Preferably, the ethylene feed velocity will be within the range of 200 to 500 meters per second, with the high velocity achieved by throttling the ethylene feed flow immediately before it enters the reactor. The velocity obtained in the discharge nozzle is used in producing the eddying motion around the autoclave center line.

Surprisingly, it has been found that the assembly of the feed tubes with the discharge nozzles of the present invention, creates a flow pattern which also involves vigorous axial mixing. The number of explosions has been strongly reduced by the omission of unlubricated bearings, while the omission of the mechanical stirring device has increased the useful reaction space to a considerable degree. The impression is gained that, since the reduction in the number of explosions is of a magnitude that cannot be attributed exclusively to the omission of the unlubricated bearings, the mixing effect in the reactor has been decidedly improved.

The process of the present invention provides a number of advantages in the high pressure polymerization of ethylene. One of the main advantages is that, as a result of feeding a gas flow at a high velocity through a discharge nozzle, direct and intimate mixing occurs, which permits continuous contact between the reaction components. The improved homogeneity of the reaction contents enables the temperature and pressure in the autoclave to remain more constant for a longer period of time. A further advantage is that the reaction space contains no moving parts whatsoever, which prevents undesirable side reactions from being initiated by such parts. Dead spaces in the reactor can be avoided by a greater freedom in the design of the autoclave interior, which has an improved effect on the homogeneity of the reactor contents. The removal of the mechanical stirring device, with the associated driving motor, from an existing autoclave, produces an overall space savings and, in particular, increases the useful autoclave space, thus increasing the autoclave capacity. In addition, the autoclave construction is simplified.

The present invention also relates to an autoclave reactor for carrying out the aforesaid process. The autoclave of the present invention is characterized by at least one feed inlet which is positioned relative to the cylindrical autoclave wall so that gas issuing from each inlet imparts a rotary mixing motion to the autoclave contents. Such feed inlet or inlets may consist of non-radial bores in the autoclave wall. A more practical embodiment, however, is to use one or more feed tubes which are sealed against the autoclave wall, and protrude through the autoclave wall into the reaction space therein. Such feed tubes are provided with narrow bores so positioned that gas issuing from such bores imparts a rotary and mixing motion to the autoclave charge or contents. Such a feed tube may be carried through the cylindrical autoclave wall or through the cover and/or bottom of the autoclave and should reach inside the autoclave reactor space. In any event, the feed tube is closed at the interior end thereof and has a lateral, tangentially directed discharge opening between its closed end and the autoclave wall. When a plurality of feed tubes are employed, the tubes may be located anywhere within the autoclave but it is strongly preferred, in view of the flow pattern, to place such tubes in a single plane, at equal distances from the autoclave top, or alternatively to distribute such feed tube over two or more planes at different distances from the autoclave top. In the latter arrangement, the reactor will preferably be constructed to include a plurality of polymerization zones, in which the same pressure, but different polymerization temperatures, prevail. This can be accomplished by placing a device which constricts the free cross-sectional area of the autoclave between each two feed tubes or groups of feed tubes. Preferably, such a device is a round plate having an outer diameter smaller than the inside diameter of the autoclave, and set normal to the axis of the autoclave, leaving an annular slit between its circumference and the autoclave wall. Other devices constricting the free cross-sectional area of the vessel, such as sieve plates, grids with relatively thick rods, and the like, may also be used to divide the autoclave into two or more compartments, each compartment having at least one feed inlet of its own.

Figure 2:
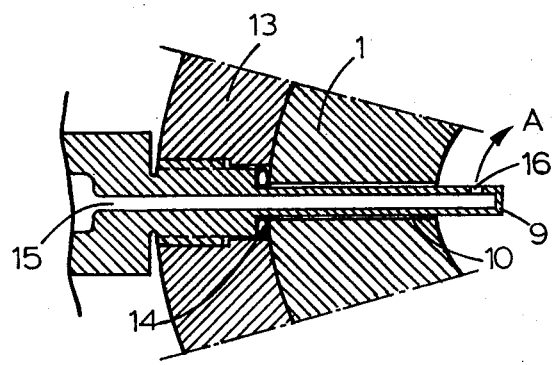

The apparatus of the present invention will be understood more clearly by reference to the accompanying drawings, wherein FIG. 1 is a longitudinal section of an autoclave of the present invention, and FIG. 2 is an enlarged radial section of a feed tube of FIG. 1, taken along line II — II.

In FIG. 1, autoclave 1 is an essentially cylindrical, thick-walled vessel, closed at the top by lid 2. Lid 2 is fixed to the autoclave 1 by clamps 3 and clips 4. A compressible packing 5 is placed between autoclave 1 and lid 2, and lid 2 is provided with openings 6 in which rupture discs (not shown) may be fitted. At the bottom of autoclave 1, a bottom piece 7 is fixed (in a manner similar to lid 2) by way of clamps 3a and clips 4a. Bottom piece 7 has a central discharge opening 8 and a compressible packing 5a between the bottom piece and the main body of the autoclave. A plurality of radial bores 10 are in the wall of vessel 1. Each bore 10 contains a feed tube 9 (only one of which is shown for the purpose of clarity). Each feed tube 9 is sealed against the wall of vessel 1, and is at an equal distance from the top of the autoclave (although the feed tubes may be at different distances from the autoclave top if desired). Other bores in the wall of autoclave 1 contain a thermocouple 11 and a pressure gauge 12. FIG. 2, which is drawn to a larger scale than FIG. 1, illustrates the sealing of feed tube 9 against the wall of autoclave 1. Feed tube 9, which has a twice stepwise thickened outer wall, is screwed with the screw thread on the first thickened part into a ring 13 fitted around the vessel 1. A lens ring 14 provides the actual sealing between the tube 9 and the wall of autoclave 1. The tube 9 has a longitudinal bore 15 which, near its interior end, connects to a radial bore 16, which forms the discharge nozzle. The interior end of tube 9 is closed. The axis of bore 16, as illustrated in FIG. 2, lies in the plane of the drawing and is normal to the axis of the feed tube 9, and is at some distance from the inner wall of autoclave 1. While the axis of bore 16 may deviate slightly from this position, each axis of each feed tube should be so placed that gaseous medium flowing from each bore 16 will cause the vessel contents to rotate in a given direction. This is so when each feed tube contains several bores, or when several separate feed tubes are used. The direction of rotation is indicated in FIG. 2 by arrow A.

In operation, ethylene mixed with a free radical initiator is supplied under high pressure to autoclave 1 by way of feed tube 9. The isentropic energy conversion from pressure into velocity, which occurs upon expansion when the ethylene enters the autoclave 1 through bore 16, causes a direct impulse to be transferred to the autoclave contents, with the result that such contents are set in, and kept in, rotary motion. The pressure drop across bore 16 and hence the velocity of the entering ethylene, must be high enough so that sufficient turbulence, with accompanying micromixing, and sufficient axial macromixing, are obtained.

To ensure accurate dimensioning of the injection opening, it may be assumed that the pressure drop across the injection opening is small compared with the absolute pressure, so that the flow can be regarded as incompressible. For the case of complete conversion of the potential energy into kinetic energy, the smallest radial cross-sectional area follows from the relation:

$$F = \sqrt{\frac{\rho V^3}{2N}}$$

in which $F$ = radial cross-sectional area in m$^2$
$N$ = converted power in watt
$V$ = throughput in m$^3$/s
$p$ = specific mass in kg/m$^3$ Velocity v and pressure drop $\Delta p$ can then be calculated from the formula: $v = V/F$ and $\Delta p = 1/2\ pv^2$. Here, $v$ is the velocity through the smallest cross-section in m/s and $\Delta p$ is the pressure drop across the discharge nozzle in newton/m$^2$.

The mixing power $N$ supplied by the jet is equal to the product of gas transport $V$ and pressure difference $\Delta p$ across the discharge openings. When the reactor contents are larger and, hence, the value of $V$ is numerically greater, a much lower value of $\Delta p$ WILL SUFFICE, WHICH IS EVIDENT FROM THE FOLLOWING EXAMPLES.

Initiators suitable for the polymerization of ethylene at high pressure according to the process of the invention are of the conventional free radical type, typically a peroxide or other oxygen-containing compound, such as lauroyl peroxide, ditertiarybutyl peroxide, tertiarybutyl peracetate, tertiarybutyl perbenzoate, octanoyl peroxide (capryloyl peroxide), azo-iso butyronitril, nonaoyl peroxide, decanoyl peroxide, as well as other organic and inorganic peroxides.

The organic peroxides are preferred of the above initiators. Specific examples of suitable initiators include tertiarybutyl per-benzoate ditertiarybutyl peroxide, octanoyl peroxide, decanoyl peroxide.

The initiators, which may be mixtures, are preferably dissolved in a solvent, such as a saturated hydrocarbon, or an aromatic hydrocarbon, or an alcohol and mixtures thereof or the like, thus comprising the initiator solution. Likewise, oxygen gas e.g. as a solution, e.g. in methanol, may be used.

The usual initiators are effective at very low concentrations of the order of five to 50 parts per million by weight, based on the amount of ethylene and preferably of the order of 20 parts per million by weight.

The process of the present invention may be utilized to produce ethylene homopolymers and copolymers of ethylene with copolymerizable monomers. The following examples illustrate the production of ethylene homopolymers but it will be clear that the present invention has a wider scope, and that copolymers of ethylene with one or more unsaturated copolymerizable compounds can be produced. The ethylene may be copolymerized with less than 50 mole percent of other vinyl unsaturated compounds, such as acrylic acid, methacrylic acid and salts, esters and amides of these acids, as well as vinyl esters of saturated carboxylic acids, such as vinyl acetate.

EXAMPLE I

A reactor of relatively small capacity (1 liter) and an L/D ratio equal to 1, was fitted with four similar, centrally positioned discharge nozzles, the minimum bore diameter of each nozzle being 0.107 mm. Through these four holes ethylene at a temperature of 50° C and an initial pressure of 1,800 atmospheres was fed into the reactor at a rate of 15 kg/h. The specific volume of ethylene under said conditions being 0.00178 m³/kg, the ethylene velocity at introduction into the autoclave interiors was 208 m/s. The kinematic viscosity of ethylene under said conditions being $0.22 \cdot 10^{-6}$ m²/s, the Reynolds number for the ethylene flow in the nozzles was $10^5$. The mixing power derived from such ethylene flow was 121 watt. By feeding in an organic peroxide initiator (octanoyl peroxide) a continuous polymerization reaction was maintained in the reactor for 40 hours at a temperature of 190° C and a pressure of 1600 atmospheres. The polyethylene obtained amply satisfied conventional quality requirements.

EXAMPLE II

An autoclave similar to the one show in FIGS. 1 and 2, of approximately 10 liters capacity, and with an L/D ratio equal to 10, was fitted with two tangentially positioned injection openings, each with a smallest bore diameter of 0.5 mm. These injection openings were placed at different levels (0,750 and 0,375 meters from the autoclave bottom). Through these holes ethylene was fed to the reactor, in which a polymerization process was kept going for 20 hours, under the following conditions:

Reactor pressure 1600 kg/cm²; reaction temperature at both injection levels 180° C; gas load 160 kg/h, i.e., 80 kg/h per injection opening. Previously, 8 percent by volume of propane had been added to the ethylene gas. The gas inlet temperature was 30° C. The pressure difference across the injection openings was 110 kg/cm². The ethylene velocity at introduction into the autoclave interiors was 189 m/s. The power derived from the gas in each opening was about 400 watt. The consumption of initiator (octanoyl peroxide) was 0.6 kg per ton of polymer. The polyethylene obtained had a melt index of 5 and a specific gravity of 0.9293.

EXAMPLE III

The reactor of example II was operated under a high gas load. The reactor pressure was 1300 kg/cm² and the reaction temperature at both levels 180° C. The gas load was 200 kg/h, i.e. 100 kg/h per injection opening. The gas inlet temperature was 30° C. 7 percent by volume of propane had been previously added to the gas. The pressure difference across the opening was 170 kg/cm². The ethylene velocity at introduction into the autoclave interiors was 240 m/s. The power derived from the gas in each injection opening was about 800 watt. The consumption of initiator (octanoyl peroxide) was 0.9 kg per ton of polyethylene. The product obtained had a melt index of 4.5 and a specific gravity of 0.9265.

Example IV

In the method of Example II, a reactor with a capacity of about 10 liters and an L/D ratio of ten was fitted with two injection openings at different levels (0.750 and 0.375 meters from the reactor bottom), each opening having a smallest bore diameter of 0.5 mm. In this reactor a polymerization reaction was maintained in two polymerization zones at a low gas load for 24 hours. For this purpose a partition was fitted 70 mm above the lower injection opening, so that two compartments were formed, with the free cross-sectional area of such partition being 5 percent of the free cross-sectional area of the autoclave.

Operating conditions were as follows: reactor pressure 1300 kg/cm²; reaction temperature upper compartment 185° C; reaction temperature lower compartment 240° C. The gas load on each injection opening was 80 kg/h. 3 percent by volume of propane had been added to the gas. The gas inlet temperature was 20° C. The pressure difference across each opening was 110 kg/cm². The ethylene velocity at introduction into the autoclave interiors was 196 m/s. The power derived from the gas passing through each injection opening was about 450 watt. The initiator consumption was 0.7 kg per ton of product for the upper hole and 0.19 kg per ton of product for the lower hole. Tertiarybutyl per-benzoate was supplied as initiator in the ethylene passing through each injection port. The polyethylene obtained had a melt index of 22 and a specific gravity of 0.9220.

Example V

In the method of example II a reactor with a capacity of 10 liters and an L/D ratio of 10 was fitted with two injection openings at different levels (0.750 and 0.375 meters from the autoclave bottom) each opening having a smallest bore diameter of 0.6 mm. In the reactor, which had only one polymerization zone, a polymerization reaction was conducted at a high gas load for 24 hours.

Operating conditions were as follows: reactor pressure 1300 kg/cm$^2$; reaction temperature at both levels 190 °C. The gas load was 340 kg/h total or 170 kg/h per injection opening. 19 percent by volume of vinyl acetate had previously been added to the gas. The gas inlet temperature was 30 °C and the pressure difference across the injection openings was 250 kg/cm$^2$. The ethylene velocity at introduction into the autoclave interiors was 295 m/s. The power derived from the gas in each injection opening was about 2000 watt. The consumption of initiator (octanoyl peroxide) was 1.5 kg per ton of ethylene/vinyl acetate copolymer. The product had a melt index of 300 and a specific gravity of 0.9400.

Comparative Experiment

A reactor with a capacity of 10 liters and an L/D ratio of 10, instead of being provided with tangentially positioned injection openings as in Examples II–V, was fitted with a centrally suspended supply tube for ethylene with regularly spaced, radially positioned injection openings of 0.25 mm internal diameter. A polymerization reaction, although initiated, could not be maintained for a long time, because the lower holes of the supply tube become clogged up due to the formation of polymer therein. This occurred in the lower part of the supply tube possibly because the initiator in the ethylene feed was activated by heat from the reactor, while the feed was still in the tube.

The experiment was repeated with a shorter residence time of the ethylene in the reactor, but polymer from the reactor was then found to deposit on the outside of the relatively cold tube.

Thermal insulation of the tube with teflon discs and spraying on Al$_2$O$_3$ did not overcome these difficulties.

From the above examples, it appears that, to ensure efficient operation, it is preferred that the injection openings are situated in the autoclave wall, and preferably are placed in a tangential position.

Further advantages which may be obtained by the practice of the present invention and which cannot be obtained with a reactor fitted with a mechanical stirrer are as follows:

1. An increase in production time due to a reduction of the number of decompositions, and the consequent saving in time spent on disassembly work after a decomposition;
2. Longer life of the reactor and associated lines;
3. Simplified operation through reduction of the number of feed inlets for the initiator;
4. Improved product through better control of the residence time, the possibility of using recipes suitable for a higher operating temperature, and improved mixing;
5. Lower investments in the reactor, because a stirrer motor compartment can be dispensed with; and
6. Lower initiator consumption.

We claim:

1. In a process for the continuous high-pressure polymerization of ethylene in a cylindrical autoclave reactor, in the presence of a free radical initiator, at an elevated temperature and a pressure of about 800 to about 5000 atmospheres, with mixing of the contents of the autoclave, and with cold ethylene being fed to said autoclave to mix with the hot contents thereof, the improvement comprising supplying the kinetic energy required for the mixing of the autoclave contents by throttling the flow of ethylene into the autoclave to create a turbulent flow of ethylene, wherein the Reynolds number for the ethylene flow exceeds 2100 with the ethylene introduced through at least one inlet perpendicular to the major axis of the cylindrical autoclave reactor, with tangential feeding of ethylene so as to impart rotary motion in the same direction for all inlets when more than one inlet is used, whereby a direct impulse is transferred from the entering ethylene to the contents of the autoclave to produce macroscopic circulations in said autoclave, whereby mechanical stirring can be eliminated.

2. The process as claimed in claim 1, wherein the ethylene flow is throttled immediately before entering the autoclave, and said ethylene flow collides at a velocity of at least 150 meters per second with the contents of the autoclave, whereby said contents, together with the entering ethylene, is set and kept in a rotary, mixing motion.

3. The process as claimed in claim 1 wherein said ethylene and said initiator are fixed mixed together at a low temperature, and subsequently such mixture is fed to said autoclave with throttling to produce turbulent flow.

4. The process as claimed in claim 1, wherein the ethylene is continuously supplied to said autoclave as a turbulent flow through at least one said inlet in the wall of the autoclave, and the polymerization product is continuously discharged from the autoclave.

5. The process as claimed in claim 4, wherein only one inlet is used to supply ethylene to said autoclave.

6. The process as claimed in claim 4, wherein a plurality of inlets are used to supply the ethylene to said autoclave, with all inlets being in the same plane and at equal distances from the top of the autoclave.

7. The process as claimed in claim 4, wherein a plurality of inlets are used, said inlets being located in at least two planes at different distances from the autoclave top, with such planes located at different polymerization zones in said autoclave.

8. Apparatus for the continuous high-pressure polymerization of ethylene at elevated temperatures in the presence of free radical initiator, said apparatus comprising a cylindrical autoclave having a top and a bottom, said autoclave closed at the top and having a discharge opening in the bottom, and at least one inlet means in the cylindrical wall of the autoclave, each inlet means being in a plane perpendicular to the major axis of the cylindrical autoclave, with tangential feeding to impart a rotary motion to the autoclave contents by gas flowing from said inlet means, wherein the motion imparted to the said contents is in the same direction for each inlet means, when more than one inlet means is used.

9. Apparatus as claimed in claim 8, wherein at least one supply tube means extends through the cylindrical wall of said autoclave into the interior thereof, said supply tube means defining narrow bores therein and said supply means imparting an eddying motion to the autoclave contents when a gas flows through said supply tube means.

10. Apparatus as claimed in claim 9, wherein said supply tube means is an elongated tube which is closed at the end in the autoclave interior and has a lateral tangentially disposed discharge opening through the wall thereof between said end and the autoclave wall.

11. Apparatus as claimed in claim 10, wherein a plurality of elongated tubes are used, said elongated tubes all positioned in one plane and at equal distances from the autoclave top.

12. Apparatus as claimed in claim 10, wherein a plurality of elongated tubes are used, said elongated tubes positioned in a plurality of planes at different distances from the autoclave top.

13. Apparatus as claimed in claim 12, wherein said autoclave is divided into compartments by divider means, said divider means located between each two planes in which said elongated tubes are situated and constricting the free cross-sectional area of the autoclave at such location.

14. Apparatus as claimed in claim 13, wherein said divider means is a round plate having an outer diameter smaller than the inside diameter of said cylindrical autoclave, said plate being disposed normal to the axis of the autoclave.

* * * * *